Figure 1:
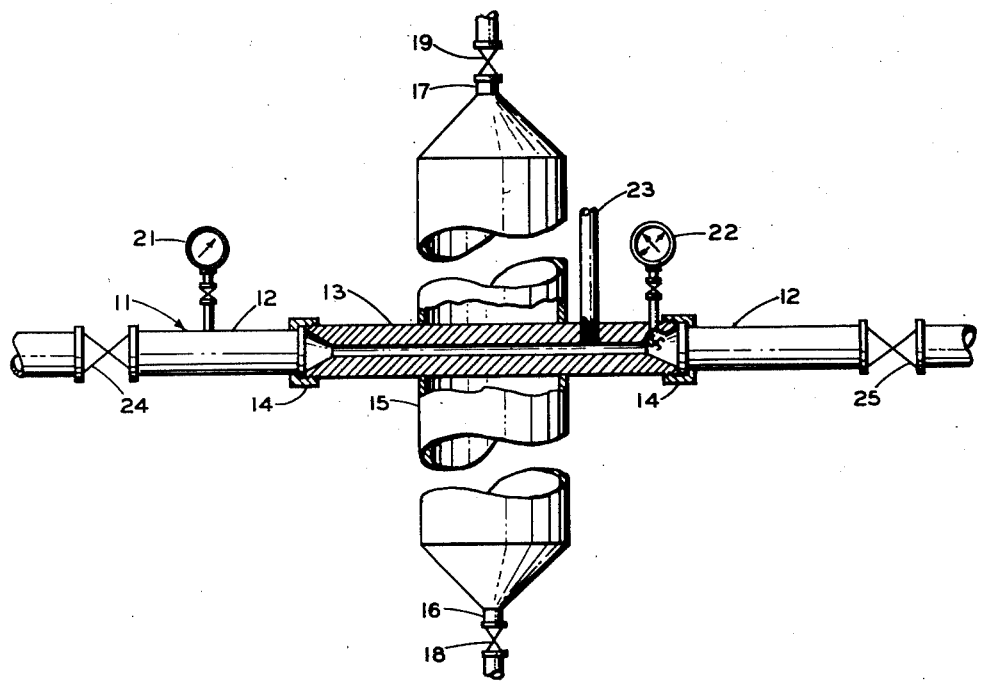

INVENTOR.
E.J. McCREARY
BY
ATTORNEYS

Patented June 30, 1953

2,643,541

UNITED STATES PATENT OFFICE 2,643,541

MEANS AND METHOD FOR MEASURING AND CONTROLLING HYDRATE FORMING CONDITIONS

Elmer J. McCreary, Bartlesville, Okla., assignor to Phillips Petroleum Company, a corporation of Delaware Application December 19, 1949, Serial No. 133,811

8 Claims. (Cl. 73—25)

1

This invention relates to the formation of hydrates in a flowing gas stream. In one of its more specific aspects it relates to means for determining specific conditions under which hydrates form in a flowing gas stream. In another of its more specific aspects it relates to a method for determining specific conditions under which hydrates form in a flowing gas stream.

The formation of hydrates during transportation of gaseous materials through pipe lines poses a very serious problem. Hydrates of various materials form under conditions of high pressure and low temperature. High pressures customarily used in pipe lines thus provide one of the accelerating conditions for hydrate formation. A careful check must therefore be made of pipe line temperatures. The petroleum industry has for many years necessarily utilized heating means for maintaining the temperature of valves and constricted portions of gas flow lines so as to maintain those portions of the flow line at temperatures sufficiently high to prevent the formation of hydrates therein. Formation of hydrates in critical points, such as valves and constricted areas of a flow line, seriously reduces the volume of gas flow through the flow line and quite often causes the complete cessation of gas flow therethrough. Utilization of heating means in connection with selected portions of a gas flow line have of necessity been of a hit or miss nature and as a result has in some cases been ineffective.

An object of this invention is to provide improved means for determining the temperature at which hydrates form in a flowing gas stream at a given pressure. Another object of the invention is to provide means for determining the pressure at which hydrates form in a flowing gas stream at a given temperature. Another object of the invention is to provide a method for determining the temperature at which hydrates form in a flowing gas stream at a given pressure. Another object of the invention is to provide a method for determining the pressure at which hydrates form in a flowing gas stream at a given temperature.

Another object of the invention is to provide a means and method for continuously determining and recording the hydrate forming temperature of a given gas stream. Another object of the invention is to provide a means and method for continuously regulating the addition of heat to critical points in gas flow lines in accordance with variations in hydrate forming conditions therein. Other and further objects and advantages will be apparent to those skilled in the art upon study of the accompanying disclosure.

Broadly speaking, this invention relates to the continuous measurement of hydrate forming conditions in a testing device by continuously drawing off a portion of gas flowing through a given flow line, imposing a restricted area in the draw-off line, and passing a cooling fluid in indirect heat exchange relation with that restricted conduit portion in accordance with the pressure drop through that conduit portion. The temperature of the gas is continuously measured as the gas in the testing device is maintained at initial hydrate forming conditions while the temperature at a critical point in the main flow line is also continuously measured. Heat is then applied to the critical portion of the flow line in response to variations in temperature differential between the restricted portion of the draw-off line and the critical portion of the main flow line.

Figure 2:
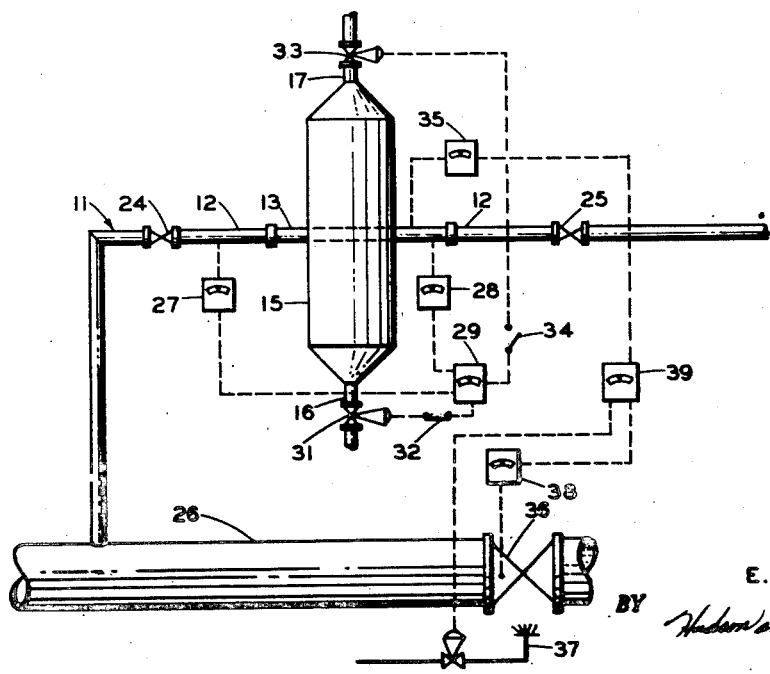

Better understanding of the invention will be obtained upon reference to the drawings in which Figure 1 is an elevation, partly in section, of the hydrate formation testing device of this invention. Figure 2 is a schematic representation of a preferred arrangement of the hydrate formation testing device and main gas flow line, together with measuring, recording, and control devices.

Referring particularly to Figure 1 of the drawing, gas draw-off conduit 11 comprises unrestricted conduit portions 12 with restricted conduit portion 13 maintained between the unrestricted portions by means of coupling members 14. Restricted conduit portion 13 forms a gas pressure reduction tube and has an inner diameter of between $\frac{1}{32}$ inch and $\frac{1}{4}$ inch. Best control of the formation of hydrates in restricted portion 13 is obtained when the inner diameter of restricted conduit portion 13 is between $\frac{1}{32}$ inch and $\frac{1}{8}$ inch. Surrounding at least a portion of restricted conduit portion 13 is a cooling chamber 15 having cooling material inlet conduit 16 and a cooling material outlet conduit 17 provided therein, preferably at its opposite ends. Cooling material inlet valve 18 is provided in inlet conduit 16 and a cooling material outlet valve 19 is provided in cooling material outlet conduit 17. Pressure measuring means 21 is provided in the unrestricted portion of conduit 11 which is upstream restricted conduit portion 13 and pressure-velocity measuring means 22 is provided in the downstream end portion of restricted conduit portion 13. Pressure-velocity measuring means may be a conventional orifice meter. The measuring means 21 and 22 are standard items of equipment produced by various equipment companies and it is therefore believed that a detail of the structure is not necessary herein. Temperature measuring means 23 is provided in restricted conduit portion 13, preferably at a point downstream of cooling chamber 15 for indicating gas temperature therein. Valves 24 and 25 are provided in unrestricted conduit portions 12 at points upstream of pressure measuring means 21 and downstream of restricted conduit portion 13, respectively.

In the operation of the device shown as Figure 1 of the drawings, a portion of a gas stream is drawn off from a main flow line, not shown, and is passed through valve 24 and the upstream unrestricted conduit portion 12 into restricted conduit portion 13 which conveys the gas therethrough into the downstream unrestricted conduit portion 12 and valve 25 and is subsequently vented from the system. The pressure of the gas upstream of restricted conduit portion 13 is measured by pressure measuring means 21. Pressure of the gas at the downstream end of the restricted conduit portion 13 is measured by measuring device 22 as is the velocity of gas flow at the downstream end of restricted conduit portion 13. Cooling fluid is introduced into cooling chamber 15 through valve 18 and conduit 16 and is passed through chamber 15 in indirect heat exchange relation with the gas stream flowing through restricted conduit portion 13. A portion of the cooling fluid is removed from chamber 15 through conduit 17 and valve 19 and may be recycled to conduit 16 through any cooling or compression means, not shown. The cooling fluid may be a cooled brine liquid, a liquid hydrocarbon, or any other type of normally liquid material or may be a liquefied normally gaseous material which may be partially gasified so as to lower the temperature of the cooling material within chamber 15. The normally liquid material may be cooled in any conventional manner. A liquid may be maintained in chamber 15 and a normally gaseous material passed therein for cooling. In most field operations it will ordinarily be more practical to use a cooled normally liquid material rather than a normally gaseous material as the cooling fluid.

As the gas stream flows through conduit 11, cooling fluid is passed through chamber 15 and the temperature of the gas stream within restricted conduit portion 13 is lowered to a point at which hydrates begin to form within the restricted conduit portion. As such hydrates begin to form, the pressure as measured by measuring device 22 will decrease rapidly until the formation of hydrates within restricted conduit portion 13 becomes such as to cause complete cessation of gas flow therethrough. Operation of this device by the method of this invention substantially prevents complete cessation of gas flow through conduit 11. As pressure falls off in the downstream end of restricted conduit portion 13, the flow of cooling material through cooling chamber 15 is substantially reduced, thus allowing the gas stream passing through conduit 11 to retain a greater portion of its heat which prevents a building up or accumulation of substantial amounts of hydrates within restricted conduit portion 13. Flow of cooling material through chamber 15 can be substantially controlled by either valve 18 or 19. Flow of cooling material through chamber 15 is also varied at times in response to variations in velocity of gas flow, as measured by measuring device 22, resulting from variations in gas pressure upstream of conduit portion 13. When normally gaseous liquefied cooling material is being used as a cooling fluid, pressure of the cooling fluid within chamber 15 may be substantially controlled by means of valve 19. Regulation of normally liquid material flow may, on the other hand, be controlled by means of valve 18. The temperature of the gas stream under hydrate forming conditions is continuously measured at the downstream end portion of restricted conduit portion 13 by means of temperature measuring device 23 which may be an ordinary thermometer or a potentiometer attached to the conduit by means of a thermocouple.

In many instances, in the transportation of gaseous materials through pipe lines, the composition and impurity content of the gas varies considerably. Such would be the situation in a gas line carrying gas from a plurality of wells, any of which wells may be cut off from the line for a time. Formation of hydrates varies with the varying composition and impurity content of the gas stream. It is thus often desirable to maintain a continuous record of hydrate forming conditions for a given gas stream. The device shown in Figure 2 of the drawings is a system by which automatic recording of hydrate forming conditions of the gas stream is obtained and the conditions which would cause hydrate formation at critical points within the main gas line are automatically prevented thereby.

Referring particularly to Figure 2 of the drawings, draw-off conduit 11 extends from main gas conduit 26 and is provided with restricted conduit portion 13 which is at least partially surrounded by cooling chamber 15 as shown in Figure 1. Pressure measuring gauges 27 and 28 are connected to the unrestricted portion of conduit 11 upstream of restricted conduit portion 13 and the downstream end portion of restricted conduit portion 13, respectively. Differential pressure control 29 is operatively connected to pressure measuring devices 27 and 28 and is in turn operatively connected to valve 31 which is provided in inlet conduit 16. Cut-off means 32 are provided in the connection between differential pressure controller 29 and valve 31, thus providing means by which automatic operation of valve 31 may be discontinued. Differential pressure controller 29 is also operatively connected to outlet valve 33 and may be disconnected therefrom by cut-out means 34 which are provided in the connection between differential pressure controller 29 and valve 33. Temperature measuring device 35 is operatively connected to restricted conduit portion 13, preferably at a point downstream of cooling chamber 15. A critical point in main gas conduit 26 is schematically represented by valve 36 therein. A heater 37 is provided adjacent the lower portion of valve 36. Heater 37 may be any conventional type of heater, either electrical or gas burning. Temperature measuring device 38 is connected to conduit 26, preferably at valve 36. Differential temperature controller 39 is operatively connected to temperature measuring device 35 and temperature measuring device 38. Differential temperature controller 39 is also operatively connected to heater 37 so as to increase or decrease the heating energy output by heater 37.

The operation of the device shown in Figure 2 of the drawings is much the same as is described in connection with Figure 1 of the drawings.

Pressure is measured at the upstream and downstream ends of restricted conduit portion 13 and those measurements are conveyed to differential pressure controller 29 which is set to actuate either of valves 31 or 33 or both in accordance with variations from a predetermined pressure differential. As the pressure differential across restricted conduit portion 13 increases, differential pressure controller 29 actuates either valve 31 or 33 or both so as to reduce the flow of cooling materials through cooling chamber 15, thus allowing the temperature within restricted conduit portion 13 to be maintained at such a temperature that hydrates are just on the verge of forming at the pressure condition of the gas. Pressure measuring means 27 and 28 and temperature measuring means 35 and 38 are preferably adapted so as to maintain or record a continuous record of pressures and temperatures measured thereby. The temperature of the gas passing from restricted conduit portion 13 is measured by temperature measuring device 35, which temperature is transmitted to differential temperature controller 39. Temperature of the gas within main gas conduit 26 as measured at a critical point in that conduit, such as at valve 36, is measured by temperature measuring device 38, which temperature is also transmitted to differential temperature controller 39. Differential temperature controller 39 is operatively connected to heater 37 so as to increase the amount of heat output by heater 37 as the difference in temperature, as measured by temperature measuring devices 35 and 38, decreases below a minimum predetermined difference and decreases the heat output of heater 37 as the temperature differential increases above a predetermined point. By operation in this manner it is possible to maintain the critical point of main gas conduit 26 free of hydrate formation regardless of a change in the impurity content of the gas stream which ordinarily would cause hydrate formation at such a point.

Hydrate formation is retarded in some situations by introducing antifreeze agents such as sodium chloride, calcium chloride, or certain alcohols or glycols into the main gas conduit. Introduction of such materials into the main gas conduit could be easily controlled by modification of the device of this invention. Antifreeze agents may be introduced into the main gas conduit in accordance with a temperature differential between the testing device and the main gas line.

It may also be desirable to utilize the device of this invention to automatically regulate and control the operation of dehydration such as is used to reduce the dew point of large volumes of gas before delivery into high pressure utility pipe lines for transmission to distant markets. In this application the device is used to control the temperature and/or flow of a liquid dehydrating agent such as diethylene glycol with which the gas is to be contacted for removal of water. Likewise the device may be used to automatically switch solid desiccant chambers.

Many other modifications of this apparatus and method of operation will be apparent to those skilled in the art upon study of the accompanying disclosure and the drawings. It is believed that such modifications are clearly within the spirit and scope of the present disclosure.

I claim:

1. A hydrate formation testing device which comprises in combination a gas flow line; a gas pressure reduction tube of between $\frac{1}{32}$ inch and $\frac{1}{4}$ inch inner diameter positioned intermediate the ends of said flow line and adapted to convey a gas stream from one portion of said flow line to another; a cooling chamber enclosing at least a portion of said gas pressure reduction tube; a cooling material inlet conduit in one end of said cooling chamber; a cooling material outlet conduit in the end of said cooling chamber opposite said inlet conduit; a pressure gauge connected to said flow line upstream of said pressure reduction tube; a pressure gauge connected to said flow line downstream of said pressure reduction tube; temperature measuring means operatively connected to said gas pressure reduction tube; and valve means connected to said cooling chamber for controlling cooling material flow through said cooling chamber.

2. The hydrate formation testing device of claim 1, wherein said gas flow reduction tube has an inner diameter of between $\frac{1}{32}$ inch and $\frac{1}{8}$ inch.

3. A hydrate formation testing device which comprises in combination a gas flow line; a gas pressure reduction tube of between $\frac{1}{32}$ inch and $\frac{1}{4}$ inch inner diameter positioned intermediate the ends of said flow line and adapted to convey a gas stream from one portion of said flow line to another; a cooling chamber enclosing at least a portion of said gas pressure reduction tube; a cooling material inlet conduit in one end of said cooling chamber; a flow control valve in said cooling material inlet conduit; a cooling material outlet conduit in the end of said cooling chamber opposite said inlet conduit; differential pressure control means attached to said gas flow line at a point upstream and at a point downstream of said gas pressure reduction tube, said differential pressure control means being operatively connected to said flow control valve in said cooling material inlet conduit; and temperature measuring means operatively connected to said gas pressure reduction tube downstream of said cooling chamber.

4. A method for continuously measuring and recording hydrate forming conditions for a given gas stream which comprises continuously diverting a portion of said gas from said gas stream; reducing the pressure and volume of said diverted gas stream in a pressure reduction zone; cooling said diverted gas stream at said pressure reduction zone by maintaining a cooling fluid in indirect heat exchange therewith; measuring the temperature of said diverted gas stream at said pressure reduction zone; measuring pressure differential encountered through said pressure reduction zone; and regulating flow of said cooling fluid and thus the temperature of said diverted gas stream at said pressure reduction zone in accordance with any change in one of the unregulated variables of gas flow through said pressure reduction zone so as to determine the temperature of hydrate formation for said gas stream.

5. The method of claim 4, wherein flow of said cooling fluid is regulated in accordance with variation in the velocity of gas flow through said pressure reduction zone.

6. A method for continuously measuring and recording hydrate forming conditions for a given main gas stream which comprises continuously diverting a portion of said gas from said gas stream; reducing the pressure and volume of said diverted gas stream in a pressure reduction zone; cooling said diverted gas stream at said pressure reduction zone by passing a cooling fluid in indirect heat exchange therewith; measuring and recording the temperature of said diverted gas stream at said pressure reduction zone; measuring and recording pressure differential encountered through said pressure reduction zone; and regulating the volume of said cooling fluid contacted with said pressure reduction zone in accordance with any change in gas flow through said pressure reduction zone, whereby the temperature of said diverted gas stream at said pressure reduction zone is controlled and the temperature of hydrate formation for said gas stream is determined.

7. The method of claim 6, wherein gas temperature is measured at a critical point in said main gas stream; and applying heat to said critical point in said main gas stream in accordance with deviation from predetermined temperature differential between said pressure reduction zone and said critical point in said main gas stream.

8. A method for continuously measuring and recording hydrate forming temperatures for a high pressure gas stream which comprises continuously diverting a portion of said gas from said gas stream; reducing the pressure of said diverted gas stream in a pressure reduction zone; cooling said diverted gas stream at said pressure reduction zone by passing a liquefied normally gaseous material in indirect heat exchange therewith; measuring and recording the temperature of said diverted gas stream at the downstream end portion of said pressure reduction zone; measuring pressure differential encountered through said pressure reduction zone; and regulating the pressure at which said liquefied normally gaseous material is maintained in indirect heat exchange relation with said pressure reduction zone in accordance with any change in pressure reduction encountered through said pressure reduction zone, whereby evaporation and temperature of said liquefied normally gaseous material is controlled and the temperature of hydrate formation for said gas stream is determined.

ELMER J. McCREARY.

References Cited in the file of this patent

UNITED STATES PATENTS

| Number | Name | Date |
|---|---|---|
| 1,272,059 | Lacy | July 9, 1918 |
| 2,192,011 | Koller | Feb. 27, 1940 |
| 2,266,981 | Miller | Dec. 23, 1941 |
| 2,489,455 | Leone | Nov. 29, 1949 |

OTHER REFERENCES

Article: in "American Gas Journal"—June 1937 "Gas Hydrates in Natural Gas Pipe Lines" by Deaton & Frost.